Nov. 7, 1961 S. A. SCHERBATSKOY 3,008,048
RADIATION DETECTING
Filed March 15, 1957 4 Sheets-Sheet 1

INVENTOR.
Serge A Scherbatskoy

INVENTOR.
Serge A. Scherbatskoy

United States Patent Office 3,008,048
Patented Nov. 7, 1961

3,008,048
RADIATION DETECTING
Serge A. Scherbatskoy, 804 Wright Bldg., Tulsa 3, Okla.
Filed Mar. 15, 1957, Ser. No. 646,413
4 Claims. (Cl. 250—83.3)

This invention relates to the study of earth formations and more particularly to the logging of subsurface formations traversed by a well or bore hole. The principal object of the invention is the provision of a method and an apparatus for making a nuclear bore hole log which will not be influenced by or contain inaccuracies due to variations in the diameter of the bore hole or due to variations in the well casing position within the bore hole.

It is now well recognized that when a source of neutrons is passed through a bore hole so that the neutrons pass outwardly from the source into the surrounding formations, a measurement of the gamma rays induced in the formations by the neutron bombardment or a measurement of the neutrons that have been slowed down in the surrounding formations and reached thermal or epithermal energies provides information as to the porosities of the formations traversed. When a formation is sufficiently porous to contain water or oil in its pore spaces, more or less of the neutrons will be absorbed in this hydrogen containing formation and a detector of gamma rays or a detector of thermal or epithermal neutrons passed through the hole in the vicinity of the source will respond to varying intensities of induced gamma rays or thermal or epithermal neutrons. A record or log of these intensities, when correlated with the depths of the measurements in the hole, will indicate the relative hydrogen contents and, consequently, the porosities of the formations. It has recently been recognized that the conventional neutron-gamma ray log or neutron-neutron log referred to above does not always provide true indications of the porosities, this being due to the fact that the detector response will be affected by variations in the diameter of the hole. Thus, if a portion of the formation walls has caved in so that the hole is larger in diameter at that depth than it is at other depths, there will be a larger amount of drilling mud or well fluid surrounding the measuring instrument. Since this well fluid contains hydrogen, many of the neutrons will be absorbed therein and the resulting log, which would appear to indicate a zone of high porosity at that depth, will be in error.

In open holes, the logging instrument usually hangs so that it rests against the side wall and actually one side of the instrument is in contact with the rocks that are being surveyed. As the instrument traverses a cavity or enlargement, the instrument hangs free and is surrounded by well fluid on all sides which affects substantially the response to the radiations from the formations. In cased wells, the logging instrument also usually hangs so that it is against one side of the casing and is in contact with the casing along a line of contact. The casing is, however, not always concentric within the bore hole, but frequently is in contact with the bore hole wall along a line of contact on one side. The line of contact of the casing with the well wall is, however, not the same as the line of contact of the instrument with the casing, and therefore big differences are sometimes introduced in the distance between the instrument and the well wall. For example, if the line of contact of the instrument with the casing coincides with the line of contact of the casing with the well wall, then the distance between the instrument and the well wall is small. If the line of contact of the instrument with the casing is 180° removed from the line of contact of the casing with the well wall, then of course, the distance between the instrument and the well wall is very much greater. As a survey progresses, the line of contact of the instrument with the casing can have any position with respect to the line of contact of the casing with the well wall, and therefore large and uncontrollable variations in the distance between the instrument and the well wall occur. In addition to the effect of cave-ins and enlargements of the bore hole, the above effect must therefore be corrected for.

In accordance with my present invention, I provide a signal representing the variation of the diameter of the well or the variations in the distance between the instrument and the side wall of the well, and by means of this signal I control the effective output of the radiation detector so as to correct the log.

For a better understanding of the invention, reference may be had to the accompanying drawing in which.

Figures 1, 2:
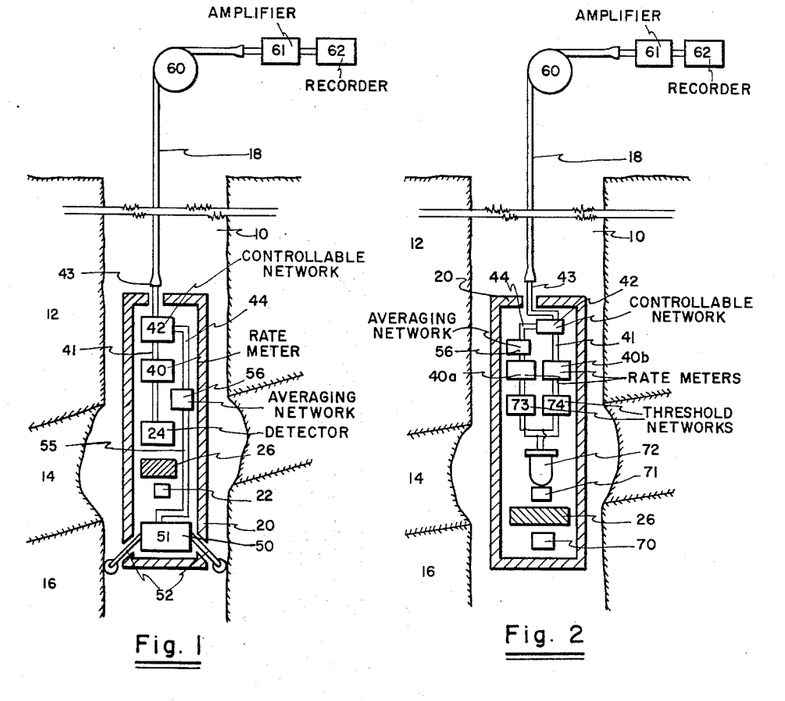
FIG. 1 illustrates a well logging system utilizing the correction due to the variation in the diameter of the hole in which the variation in the diameter of the hole is measured by means of a mechanical calipering device.
FIG. 2 illustrates a well logging system utilizing the correction due to the variation in the diameter of the hole in which the variation in the diameter of the hole is measured by means of a gamma ray measuring device that determines the distance of the instrument from the well wall.

Referring to FIG. 1, a bore hole 10 is shown as traversing several subsurface formations such as those indicated at 12, 14, and 16. It will be noted that the walls of the bore hole within the formation 14 have caved or been enlarged, or in other words, that the diameter of the bore hole within the formation 14 is larger than in the formations 12 and 16. Shown suspended from a cable 18 is a logging instrument indicated generally by an elongated, sealed housing 20, this housing containing a source 22 of neutrons and gamma rays and a radiation detector 24 separated from the source by a shield 26 capable of absorbing those gamma rays and neutrons originating in the source and which would otherwise pass upwardly directly to the detector. The detector 24 can be of any suitable pulse producing or counter type having a cylindrical cathode and a centrally disposed wire anode (not shown in the figure) and conventionally known as a Geiger-Muller counter. As it is well known, the Geiger-Muller counter is selectively responsive to gamma rays. Therefore, my well logging system will be designated as neutron-gamma ray logging and will provide a varying index of the number of gamma rays of capture, emitted by various formations as a result of neutron radiation.

In place of the Geiger-Muller counter, I may use as detector 24 a counter that is adapted to selectively respond to thermal neutrons. Such a counter has been described in the U.S. Patent 2,220,509 issued to Folkert Brons and it may have its inside walls coated with a substance such as boron that emits heavy ionizing particles as a result of interaction with thermal neutrons. Then my well logging system will be designated as neutron-neutron well logging and will provide a varying index of the number of neutrons emitted by the source that become thermalized in the formations surrounding the detector.

The output of the detector 24 is applied to a rate meter 40 which produces across its output leads 41 a D.C. voltage representing the rate of occurrence of pulses produced by the detector. The output of the rate meter 40 is applied to a controllable network 42, said network being provided with output leads 43 and control leads 44. The controllable network is adapted to amplify the signal derived from the rate meter 40 in such a manner that the amplification of this signal increases if the control signal applied to the leads 44 increases.

The housing 20 comprises also at its lower end a calipering device 50 which may be briefly described as a housing 51 provided with a plurality, such as four or more in number, of feeler or caliper arms 52 hinged to the housing 51 and extensible radially therefrom in their operative position so that they are in constant contact with the wall of the well bore hole. The caliper arms 52 are also connected to an electrical circuit (not shown) carried within the housing 51 whereby the settings of elements of the circuit are changed as the arms 52 move radially with changes in the diameter of the bore hole wall. The output signal from the calipering device 50 is proportional at any instant to the diameter of the bore hole wall. The signal is transmitted up electrical leads 55 to an averaging network 56.

Well calipering devices having outwardly extending arms connected to suitable means for recording the lateral displacement of the ends thereof are well known to the art of well logging and the detailed construction of these devices is described in U.S. Patent No. 2,267,110 to Kinley et al., issued December 23, 1941, and U.S. Patent No. 2,497,990 to Huber et al., issued February 21, 1950, and U.S. Patent No. 2,340,987 to Robidoux, issued February 8, 1944. Since the design, construction or mode of operation of the calipering device 50 forms no part of the present invention, no detailed description of the calipering device is included here. For purposes of the present invention, any calipering device having an electrical output signal proportional to the diameter of the well bore hole may be employed.

The averaging device 56 is adapted to produce across its output leads a voltage representing the average taken over certain time intervals of the voltage applied to its input leads 55. The voltage across the leads 44 represents the averaged diameter of the bore hole.

The operation of this arrangement can be easily understood considering the fact that the output of the rate meter 40 which normally should indicate porosity or water content is also sensitive to the diameter of the hole in the immediate neighborhood of the housing 20. Under normal operating conditions, i.e. when the diameter of the hole is the same for all the depths, the decrease in the output of the rate meter 40 would indicate the increase in porosity or water content of the rock, and conversely the increase in the output of the rate meter 40 would indicate the decrease in porosity or water content. On the other hand, if the diameter of the hole increases, the output of the rate meter 40 would decrease even if the porosity of the adjoining formation would remain the same, and conversely, if the diameter of the hole decreases, the output of the rate meter 40 would increase even if the porosity of the adjoining formation would remain the same.

Therefore, the variation in the diameter of the bore hole often masks the useful information that it is desired to obtain. In order, therefore, to eliminate the parasitic effects due to the variation in the diameter of the bore hole, I produce across the leads 44 a signal, the magnitude of which represents the diameter of the hole, and I apply this signal to the controllable network 42 in such a manner that any increase in the magnitude of said signal would produce a corresponding increase of the voltage across the output leads 43. In such a manner, I am able to counteract the effects of the variation in the diameter of the bore hole and produce across the output leads 43 a signal that can be directly correlated with the variation of porosity or water content in the formations adjoining the bore hole. This signal is transmitted by means of the cable 18 to the earth's surface. At the surface the cable 18 passes over a suitable reel or drum 60 adapted to measure the amount of cable payed out and thus the depth of the logging instrument in the hole. The upper end of the cable passes to an amplifier 61 which is connected in turn to a suitable recorder 62, preferably of the type which provides a trace on a moving tape or film strip.

FIG. 2 represents a modified embodiment of my invention in which I employ the scattered or transmitted gamma rays for calipering the bore hole. The same elements in FIG. 1 and FIG. 2 are designated in both figures by the same numerals. Referring now more particularly to FIG. 2, the numeral 70 designates a radium-beryllium source which is separated by means of the shield 26 from the radiation detector of the scintillometer type, comprising a crystal 71 operating in the well known manner in conjunction with a photomultiplier 72. As is well known, the radium-beryllium mixture is not a pure source of neutrons since it emits a heterogeneous radiation comprising neutrons and gamma rays. The major portion of the emitted gamma rays are due to radium in equilibrium with its products and their energies are below the value of 2.5 mev.

A portion of the beam of neutrons and gamma rays emitted by the source 70 are attenuated by the shield 26 below the crystal 71 and the remaining portion is used to irradiate the adjoining formation. The crystal 71 is composed of heavy elements such as calcium tungstate and is of sufficient size so as to absorb completely the incident photons, thus producing light flashes proportional to the energy of individual photons.

Consider now the gamma radiations emitted by the source 70 that interacts with the adjoining formations. The gamma rays emitted by the source 70 undergo numerous collisions with the electrons in the medium and a portion of these gamma rays is transmitted upwards and then scattered back to the detector. These gamma rays have energies that are lower than the primary gamma rays emitted by the source 70 and consequently their energies are almost entirely below 2 mev.

The high energy neutrons emitted by the source 70 are slowed down to thermal velocities by all the atoms encountered, but especially by the hydrogen atoms. After reaching thermal velocities, the neutrons diffuse a distance which is determined by the abundance and capture cross sections of the elements present and eventually become adsorbed by various elements. Upon absorption of a thermal neutron, each element emits a gamma ray called gamma ray of capture and having an energy characterizing the element. For instance, an atom of hydrogen by capturing a neutron emits a gamma ray of energy 2.2 mev., an atom of nitrogen by capturing a neutron emits a gamma ray of energy 10.8 mev., an atom of aluminum by capturing a neutron emits a gamma ray of energy 8 mev.

It should be noted that these gamma rays due to capture of various elements in the formations have energies usually higher than 2 mev. Let M designate the magnitude of impulses produced by the photomultiplier 72 corresponding to the energy of 2 mev. The current impulses produced by the photomultiplier 72 having magnitudes smaller than M, correspond to the scattered and transmitted photons originally emitted by the source 70, and those having magnitudes larger than M are due to the capture of neutrons emitted by the source 70.

The threshold network 73 connected to the output of the photomultiplier 72 is adapted to transmit selectively only those impulses that are below the magnitude M and selectively attenuate the impulses larger than M. These impulses below the value M are applied to the rate meter 40a. We obtain therefore across the output terminals of the network 40a a D.C. voltage having a magnitude representing the rate of impulses applied to its input terminals. It is well known that this rate of impulses depends primarily upon the diameter of the bore hole, i.e. the larger is the diameter of the bore hole in the immediate neighborhood of the source 70 and of the detector 71, the higher is the rate of impulses and the larger is the voltage output of rate meter 40a.

The voltage applied from the output terminals of the rate meter 40a is applied to an averaging network 56. The averaging network 56 is the same as the one designated by the same numeral in FIG. 1 and it provides across its output leads 44 a voltage representing the average diameter of the bore hole.

The threshold network 74 connected to the output of the photomultiplier 72 is adapted to transmit selectively only those impulses that have magnitudes that exceed M and selectively attenuate the impulses smaller than M. These impulses are applied to the rate meter 40b. We obtain thus across the output terminals of the network 40b a voltage representing the intensity of the gamma rays of capture emitted by the formation as a result of neutron radiation. In a conventional well logging system, this voltage is directly recorded on a moving strip of paper in correlation with the depth, and it is assumed to represent the neutron-gamma ray log. It is well known, however, that this voltage is to a very great extent influenced by the diameter of the bore hole, and in order to obtain an accurate record it is desirable to eliminate the effects due to the varying diameter of the hole. This is accomplished in the same manner as in the arrangement of FIG. 1 applying the output leads 41 of the rate meter 40b to the controllable network 42, said network 42 being similar to the one designated by the same numeral in FIG. 1 and having its amplification controlled by the voltage derived from leads 44. The output of the controllable amplifier is transmitted to the top of the bore hole, and passes through the amplifier 61 and is recorded in the recorder 62.

I have discovered some simplifications that may sometimes be made over the arrangement described hereinabove in connection with FIG. 2. By the use of pulse height selectors, i.e. an electrical network that passes only pulses within a given range of magnitude and blocks all pulses bigger or smaller than in this range, it is possible to realize some improvements. Such pulse height selectors are now well known; for example, one is described in FIG. 3 in Patent No. 2,648,012 issued to Serge A. Scherbatskoy.

Figure 2A:
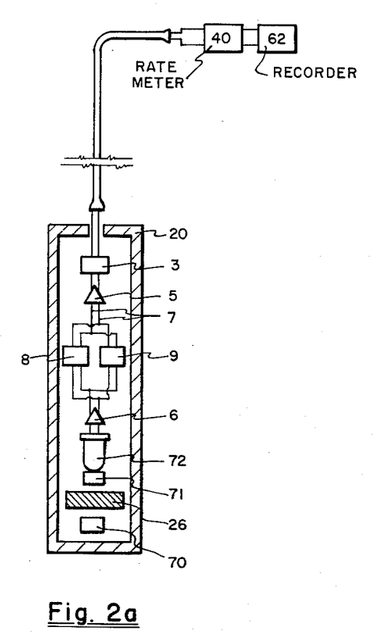
FIGS. 2a, 2b, 2c are modifications of FIG. 2.

FIG. 2a shows a modification of my invention in which pulse height selectors are employed. Like numerals in FIG. 2a designate the same elements as the corresponding numerals in FIG. 2. The source 70 generates neutrons and gamma rays and the crystal 71 and the photomultiplier 72 are designed to respond to the gamma rays that return from the formation. These gamma rays are of two kinds:

(A) Gamma rays of capture in the vicinity of 7 mev. resulting from the interaction of the neutrons with the formations.

(B) Gamma rays of about 125 kev. resulting from the scattering and transmission up the bore hole of the gamma rays of the source 70 to the crystal 71 through the formations or the environing liquid occupying the cavity or bore hole enlargement.

It has been determined:

(a) That when a bore hole enlargement is encountered, the gamma rays of (A) hereinabove decrease in intensity.

(b) When a bore hole enlargement is encountered, the gamma rays of (B) hereinabove increase in intensity.

By providing a pulse height selector network 9 responding to 7 mev. gamma rays and a pulse height selector network 8 responding to 125 kev. gamma rays, and adding the pulse outputs of these two networks, the frequency of occurrence of pulses across wires 7 can be made independent of the diameter of the bore hole. An enlarged section will cause opposite effects in the 7 mev. pulse height selector network 9 and the 125 kev. pulse height selector network 8, and these effects can be made to cancel in the frequency meter 40. In order to proportion the rate of occurrences of the pulse outputs of networks 8 and 9 so as to achieve this cancellation, the acceptance widths of the networks are suitably adjusted since the rate of occurrence of output pulses is approximately proportional to the acceptance width. In FIG. 2a, 6 and 5 are amplifiers of conventional type, and 3 is a univibrator used to standardize the pulses before transmission over the cable. Such a univibrator is well known and may also be used (although not shown) in FIGS. 2b and 2c.

Figure 2B:
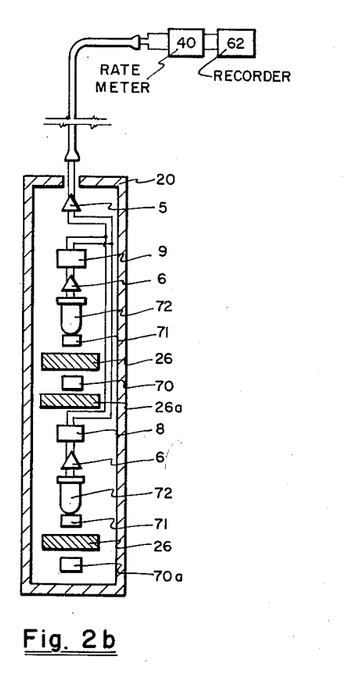

It has been found that even in the 125 kev. region there are degraded gamma rays of capture present which sometimes tend to interfere with the proper operation of the device. In some instances, therefore, it may be desirable to use two sources as shown in FIG. 2b. In this FIG. 2b, source 70 is a conventional Ra:Be or Po:Be neutron source, and source 70a is a source emitting only gamma rays; for example, a $Co^{60}$ source, and 26a is a neutron and gamma rays shield designed to shield the crystal 71 from the rays emitted by the source 70. In other respects, FIG. 2b is very similar to FIG. 2a and like numerals designate like components.

Figure 2C:
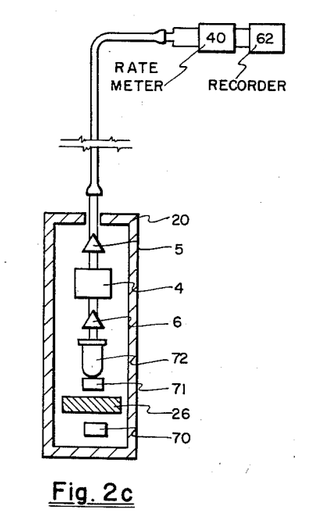
Figure 8:
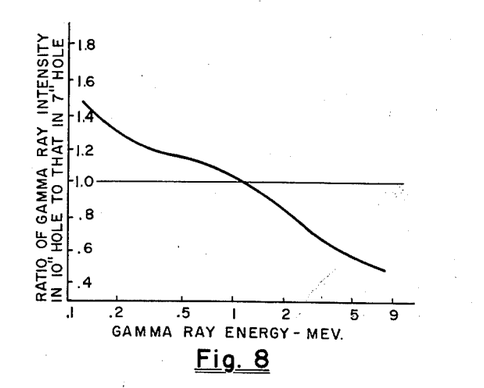
FIG. 8 shows a curve representing the effects of bore hole diameter variations on various gamma rays.

As was pointed out previously, it has been determined that in an arrangement such as that of FIG. 2a the low energy gamma rays in the vicinity of 125 kev. received by the crystal 71 are preponderantly due to the transmission or scattering of the gamma rays from the source 70, and the intensity of these gamma rays increases when the bore hole diameter increases. It has also been determined experimentally that the gamma rays in the vicinity of 7 mev. received by the crystal 71 decrease when the bore hole diameter increases. The general relationship of the gamma ray intensity variations as a function of energy is shown on the attached FIG. 8, and it is seen from this figure that in the vicinity of 1.1 mev. the intensity of the gamma rays received by the detecting system of FIG. 2a is independent of the bore hole size diameter, and therefore if gamma rays in the vicinity of 1.1 mev. are selectively received, the well logging instrument is immune to the effects of bore hole size variations. Such an arrangement is shown in FIG. 2c. The pulse height selector network 4 is adjusted to receive rays in the vicinity of 1.1 mev. Otherwise, the logging instrument shown in FIG. 2c is conventional and the numerals indicate the same components as those indicated in FIG. 2.

Figure 3:
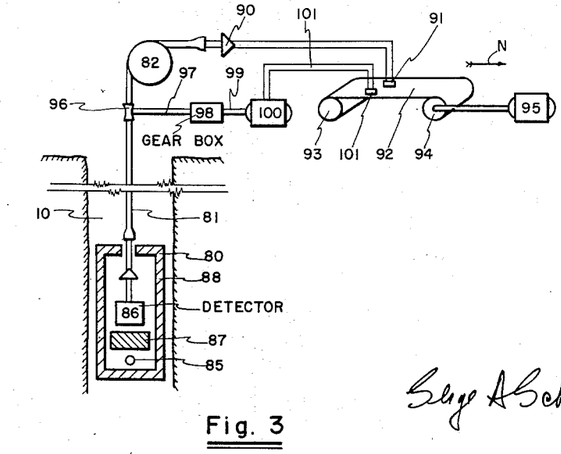
FIG. 3 shows a well logging system in which the signals are recorded on a magnetic wire.

It is apparent that the two measurements, i.e. the voltage output obtained across the leads 44 representing the detected radiation in FIG. 1 and the voltage obtained across the leads 44 representing the diameter of the hole may be obtained separately at different times by performing separate logging runs. Consider in that connection, FIG. 3 showing an arrangement for obtaining a phonographic or reproducible record log. For the purpose of exploring the formations along the bore hole, there is provided in accordance with the present invention exploratory apparatus comprising a housing 80 which is lowered into the bore hole 10 by means of a cable 81. The cable 81 has a length somewhat in excess of the depth of the bore hole to be explored and is normally wound on a drum 82 to lower the exploring apparatus into the bore hole 10 and may be rewound upon the drum 14 to raise the exploring apparatus. The exploring housing 80 comprises a source of radiation 85 which is separated from the detector 86 by means of a suitable shield 87. The output of the detector 86 is amplified in the amplifier 88 and transmitted to the top of the bore hole. At the top of the hole it passes through the drum 82 and then passes through an amplifier 90 and is applied to a magnetic recorder head 91. The head 91 is adapted to impress magnetically signals on a suitable tape 92 adapted to move in the direction of the arrow N from the spool 93 to spool 94. The spool 94 is driven by the motor 95 at a constant speed.

Figure 3A:
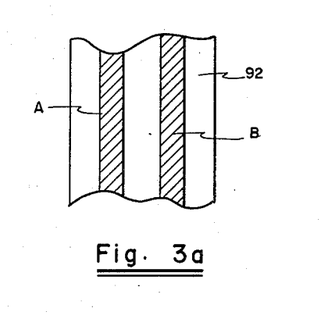
FIG. 3a shows a record on a magnetized tape obtained by means of the arrangement of FIG. 3.

In order to determine the depth of the exploratory apparatus within the bore hole 10 at any time, there is provided a measuring wheel 96 engaging the cable 81 above the top of the bore hole and adjusted to roll on the cable in such a manner that the number of revolutions of the reel 96 corresponds to the amount of cable which has moved past the reel in either direction. The reel 96 is mounted on a shaft 97 and rotation of the reel and consequently of the shaft 97 is transmitted through a gear box 98 to another shaft 99 which drives an A.C. generator 100. The output of the A.C. generator is in turn connected through leads 101 to another recording head 102 adapted to impress signals on the tape 92. The recording heads 91 and 102 are adjacent one to another and the signals impressed by said head are aligned on the magnetic tape 92 along two parallel channels as shown in FIG. 3a. The channel A receives the recording from the magnetic head 91 and these recordings represent the varying output of the detector 86 as the housing 80 is lowered into the drill hole. On the other hand, the channel B receives the recording from the magnetic head 102 and these recordings represent the reference signal obtained from the leads 101 and synchronous with the lineal downward movement of the cable 81.

It is apparent that the speed of rotation of the shaft 99 is directly proportional to the lineal speed of the cable 81 and consequently the frequency of the A.C. voltage generated across the output leads 101 of the generator 100 is directly proportional to the lineal speed of the cable 81. Furthermore, there is no sliding motion between the wheel 96 and the cable 81. Consequently, if we count the angular displacement of the wheel 96 and the corresponding lineal displacement of the cable 81 from a certain initial moment, there is always one-to-one correspondence between any subsequent angular displacement of the reel 96 and the corresponding lineal displacement of the cable 81. Thus, the number of reversals of the A.C. current impressed on the wire 92 by the head 102 corresponds to a certain lineal displacement of the cable 81 and furthermore any portion of the period corresponding to one reversal corresponds also to the lineal displacements of the cable. Therefore, any point in the channel B is directly correlated with the corresponding point on the cable 81.

It is thus apparent that as the tape 92 becomes gradually wound upon the spool 94, the diameter of the spool 94 increases, and, although the angular speed of rotation of the spool 94 may be assumed constant, the lineal speed of the tape increases as the winding progresses. In many other instances, the angular speed of the spool may not be maintained at a constant value, and consequently, a situation may frequently occur in which the lineal speed $v$ cm. per second of the tape undergoes frequent and uncontrollable changes.

As stated above, each cycle of the reference signal generated by the source 100 across the leads 101 corresponds to a determined length traveled downward by the cable 81. Assume that for a normal logging speed the frequency of the generated signal is $f$. It is also apparent that when the lineal speed $v$ of the tape increases, the frequency of the lineal distribution of the significant signal impressed on the wire by the magnetic head decreases, and when the lineal speed $v$ decreases, the frequency of the lineal distribution of the significant signal increases. Consequently, while the recording process progresses, the reference signal impressed on the tape 92 by the magnetic head 102 distributes itself sinusoidally upon the moving tape at a lineal frequency that is modulated inversely by the speed of the tape. By lineal frequency, we designate the number of alternations of the signal that is recorded lengthwise upon the unit of length of the tape. If we consider a signal having time frequency $f$, i.e. varying $f$ times per second, then it becomes apparent that each cycle of said signal will distribute itself over a length of tape equal to $v/f$ cm. Or, in other terms, each centimeter of tape will contain $f/v$ cycles. Therefore, a signal having a time frequency of $f$ cycles per second will impress itself upon the moving tape as a signal, having a lineal frequency of $f/v$ cycles per centimeter.

It is now apparent, that the faster is the lineal speed $v$ of the tape, the lower is the lineal frequency of a corresponding signal, i.e., the smaller is the number of alternations of said signal impressed upon the unit of length of said tape. Consequently, when the recording process progresses, the signal obtained from the output of the detector 86 distributes itself upon the moving tape in a definite relation to the speed of the moving tape. We thus obtained on the tape 92 two recordings impressed on two parallel channels, as shown diagrammatically in FIG. 3a.

Figure 3B:
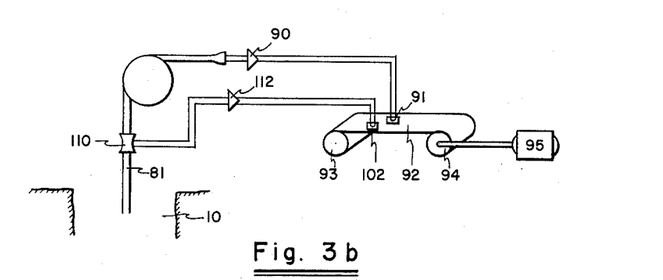
FIG. 3b shows a modified fragment of FIG. 3, utilizing a premagnetized cable for lowering the exploring instrument.

In some instances it may be desirable to utilize a cable 81 which is already premagnetized. In such an arrangement we have a lineal distribution of an alternating magnetic flux impressed along the length of the cable. As shown in FIG. 3b, a magnetic reproducing head 110 is cooperating with the cable 81. Therefore, when the cable moves downward during logging, a varying magnetic flux is intercepted by the reproducer head 110 and we thus obtain across the output leads 111 of said reproducer head an A.C. current having frequency proportional to the lineal speed of the cable. This current passes through an amplifier 112 and is applied to the recording head 102, thus producing on the movable magnetic tape 92 a channel such as the one designated by B in FIG. 3a.

I use the arrangement as shown in FIG. 3 in order to obtain two logs at two different times. The first log represents the radiations emitted by earth formations as a result of neutron irradiation and the second log represents the variation in the diameter of the hole. Each of these logs is obtained on a phonographic medium, i.e. in a reproducible form on a magnetic tape such as the tape 92. These two logs are subsequently reproduced and suitably combined by means of the arrangement of FIG. 5 so as to produce a resultant log of the improved type in which the masking effects due to the variation in the bore hole diameter have been eliminated.

In order to obtain the first of the above referred to two logs, I use as a radiation source 85 a standard neutrol source such as, for instance, a mixture of polonium and beryllium. The detector 86 may be either a gamma ray detector for obtaining a neutron-gamma log or a thermal (or epithermal) detector for obtaining a neutron-neutron log.

Across the output leads of the detector 86 we obtain a D.C. voltage representing the intensity of radiation intercepted by this detector. This voltage passes through the amplifier 88, cable 81 to the top of the bore hole, and is recorded on the channel A of the tape 92 simultaneously with the A.C. voltage obtained from the generator 100 synchronously with the downward motion of the cable 81, and impressed on the channel A on the magnetic tape. It is apparent that the signal thus recorded on the channel A of the magnetic tape is influenced by the variation in the diameter of the hole.

In order to obtain the second of the above referred to two logs, I use as a radiation source 85 an emitter of gamma rays. The emitter may be radium and in such case the bore hole is irradiated with a wide spectrum of gamma rays having energies extending from very low values to the neighborhood of 2 mev. Instead of radium, I may use any of the commercially available gamma ray emitting isotopes such as, for instance, radio-cobalt.

It is well known that the number of scattered gamma rays, and consequently the magnitude of the voltage across the output leads of the detector 86 are proportional to the diameter of the bore hole. This voltage passes through the amplifier 88 to the top of the bore hole and is recorded on the channel A of the movable tape 92 in conjunction with the signal impressed on the channel B and derived from the generator 100. We obtain thus on the tape 92 two signals, one of said signals representing the varying diameter of the bore hole, and the other signal is synchronous with the downward motion of the cable 81.

Figure 4:
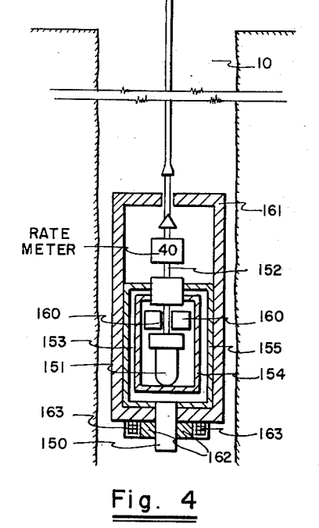
FIG. 4 shows a well logging system comprising a source and a detector of soft X-rays.

Another method for calipering a bore hole by means of soft X and gamma rays is shown in FIG. 4 and uses a scintillation counter immersed in a bore hole 10 filled with a liquid. Although the scintillation counter has desirable qualities for use in well logging, it is difficult to use, for it involves the use of a photomultiplier which is subject to deterioration at temperatures above 170° F. The temperatures in deep wells may be as high as 400° F.

The detector of radiation shown in FIG. 4 consists of a phosphor 150 and photomultiplier 151. Power is supplied to photomultiplier 151 and the output pulses are transmitted from photomultiplier 151 through leads 152. The photomultiplier 151 includes the proper voltage divider for applying the proper voltage to the various dynodes of the photomultiplier tube. The photomultiplier 151 is insulated from hot bore holes by the glass vacuum bottle 153 provided with an internal wall 154, external wall 155. The space separating said walls has been evacuated. Since even the best insulation permits a gradual rise of temperature, thermal capacitance is necessary to maintain a constant temperature. Thermal capacitance is supplied in the form of melting ice 160, also disposed within the glass vacuum bottle.

A scintillation element 150 usually designated as phosphor, which is preferably cylindrical in shape, is suspended in the bore hole 10 in direct contact with the fluid in said hole. The element 150 is attached or fitted to the exterior face 155 of the vacuum bottle 153 and is placed in an opening in the base of a pressure resistant housing 161.

On both sides of the crystal 150 is placed a source of X-rays suitably separated from the crystal by means of a shield 162. This source consists essentially of a suitable beta ray emitter 163 such as $Sr^{90}$—$Y^{90}$ placed within a container made of element having high atomic number, such as, for instance, lead. The X-rays thus produced are due mainly to the bremsstrahlung (radiative collisions) caused by the impact of high energy electrons on a lead target.

It is apparent that when the X-rays thus produced are scattered by the walls of the bore hole and the fluid contained therein strike the crystal 150, producing a burst of light within said crystal, some of this light is transmitted through the walls of the vacuum bottle 153 to the photomultiplier and are converted into light impulses.

The above arrangement is characterized by the feature that both the crystal 150 and the source of X-rays 163 are directly exposed to the pressure of the fluid in the bore hole, and furthermore, the crystal 150 is placed outside of the thermally insulating vacuum bottle 153 which contains the photomultiplier 151. In conventional arrangement, both the source of radiation and the detecting crystal are contained within the pressure-resistant housing having thick walls and in such arrangement a great portion of the outgoing and incident radiation is dissipated in the walls. This undesirable feature is eliminated in the present arrangement.

Figures 5, 5A:
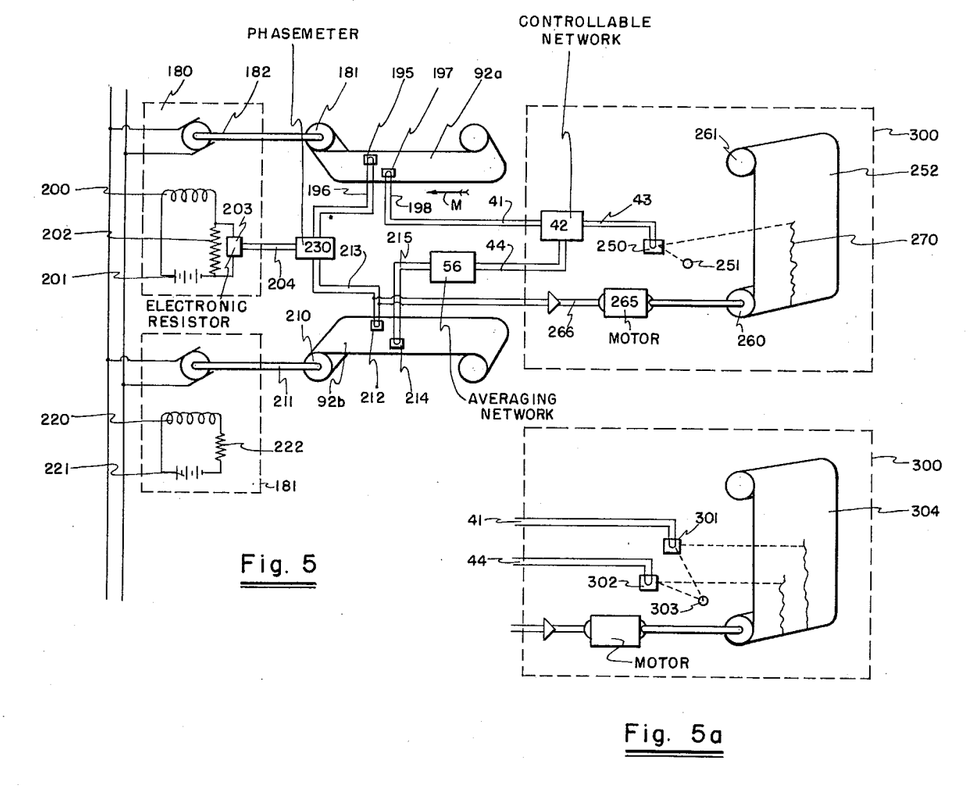
FIG. 5 shows a magnetic reproducer system for combining the records of two logs.
FIG. 5a shows a modified arrangement of FIG. 5 in which the two logs are simultaneously recorded on a single recorder medium.

The essential features of the reproducing arrangement are shown in FIG. 5 in which two motors 180 and 181 are provided to drive two magnetic reproducers, one of said reproducers being adapted to reproduce signals from magnetized tape 92a and the other reproducer being adapted to reproduce signals from the magnetized tape 92b. The magnetized tape 92a is of the type shown in FIG. 3a and it contains two channels, one of said channels representing the record of the variation in the output of the neutron detector 86 in the arrangement of FIG. 3 for neutron well logging and the other channel representing the variation of the reference signal. Similarly, the magnetized tape 92b contains in one channel the record of the variation in the diameter of the hole and in the other channel, the record of the reference signal. These records could be obtained by means of the arrangement of FIG. 3 in which the source 85 emits gamma rays and the detector 86 is adapted to detect gamma rays, or by means of the arrangement of FIG. 4.

Consider now FIG. 5, and assume that the magnetized tape 92a is driven in the direction of the arrow M, the driving force being derived from the D.C. motor 180 which rotates the spool 181 through the shaft 182. The magnetized tape 92a has impressed thereon two signals along two channels in a manner explained hereinabove. The channel B comprising the reference signal is cooperatively engaged with the reproducer head 195 having output leads 196. The channel A comprising the signal representing the output of the radiation detector 86 is cooperatively engaged with the reproducer head 197 having output leads 198. The motor 180 is provided with excitation winding 200 energized by the battery 201 in series with the resistor 202, said resistor being shunted by a controllable electronic resistor 203. The electronic resistor 203 is of a type well known in the art and its value is controlled by a suitable D.C. voltage applied to its control leads 204. As the motor 180 rotates at a substantially uniform speed, we obtain across the leads 198 the signal representing the varying output of the detector 86 and across the leads 196 the signal representing corresponding variation of the reference signal.

Similarly, the magnetized tape 92b is driven in the direction of the arrow M, the driving force being derived from the D.C. motor 181 which rotates the spool 210 through the shaft 211. The magnetized tape has impressed thereon two signals along two channels. The channel B comprising the reference signal is cooperatively engaged with the reproducer head 212 having output leads 213. The signal impressed on the channel A and representing the varying diameter of the hole is cooperatively engaged with the reproducer head 214 having output leads 215. As the motor 181 rotates, we obtain across the leads 215 a signal representing the varying diameter of the hole and across the leads 213 a signal representing corresponding variation of the reference signal. The motor 181 is provided with an excitation winding 220 in series with a battery 221 and a resistor 222.

Under normal operating conditions, the velocity of the motors 180 and 181 are substantially equal one to another and the reference signals across the leads 196 and 213 are synchronized in frequency and phase. The leads 196 and 213 are applied to a phasemeter 230 which consequently produces a zero voltage across the leads 204. This zero voltage determines the value of the electronic impedance 203, said value being so selected as to insure the equilibrium condition under which this system is operating.

Since the reference signals across the leads 196, 213 are synchronous and in phase, we have a complete correspondence between the signals obtained from the output leads 198 and 215. That is, these two signals appearing simultaneously correspond to the same depth in the bore hole 10. In accordance with my invention, the signal obtained from the leads 198 and representing the output of the radiation detector 86 is applied to the input controllable network 42 and the signal obtained from the leads 215 and representing the diameter of the drill hole is applied through the averaging network 56 to the control terminals of the controllable network 42.

The network 42 is of the same type as the one designated by the same numerals in FIG. 1 and consequently it produces across its output leads 43 a voltage representing the detector output in which the inaccuracies due to the varying diameter of the bore hole have been eliminated.

It is apparent that the logging processes which resulted in the recording on the magnetic tapes 92a and 92b were performed at different times under conditions that were not identical, and therefore in order to maintain the exact correspondence between the outputs of the leads 198 and 215, it is necessary to control the speeds of the motors 180 and 181 in a definite relation one to the other. This is being accomplished by varying the speed of the motor 180 by means of the control voltage applied to the leads 204. It is apparent that this control voltage determines the value of the electronic resistor 203 and this value determines the current flowing through the excitation winding 200 and consequently it affects the speed of rotation of the motor 180.

We can thus assume that as the tapes 92a and 92b move in the direction of the arrow M it may occur at a certain instant that the exact correspondence between the signals from the leads 198 and 215 disappears; i.e. the signal across the lead 198 representing the output of the detector 86 and the signal simultaneously appearing across the lead 215 and representing the diameter of the hole, correspond to two depths that are slightly displaced one with respect to the other. At these instants, a phase difference appears across the outputs of the leads 196 and 213, and we obtain across the output leads 204 of the phasemeter 230 a D.C. voltage having magnitude and polarity representing this phase difference. This voltage is applied to the electronic resistor 203 and changes correspondingly its value so as to modify the speed of the motor 180. If the reference signal across the leads 196 lags in phase with respect to the reference signal across the leads 213, then the speed of the motor 180 is increased so as to reduce this lag to zero. Conversely, if the reference signal across the leads 196 leads in phase with respect to the reference signal across the leads 213, then the speed of the motor 180 is increased so as to reduce the lag to zero.

It is thus apparent that the speed of the motor 180 is continuously controlled by the phasemeter 230 so as to maintain the phase difference equal to zero between the reference signals obtained from the tapes 92a and 92b. Under these conditions, the detector output obtained from the tape 198 and the diameter of the hole obtained from the tape 215 are maintained continuously in exact correspondence one with respect to the other.

The voltage derived from the output leads 43 of the network 42 is applied to a galvanometer coil 250 provided with a mirror which is adapted to move in the field of a permanent magnet (not shown in the figure) in response to the current flowing through the coil. A beam of light produced by the source 251 is reflected by the mirror 250 so as to produce on moving photosensitive strip 252 a curve showing the variation in the voltage across the leads 43.

The strip 252 is unwound from the spool 260 to the spool 261, the rotation of the spool 260 being effected by means of the motor 265 which is energized by an A.C. current from the leads 266. The motor 265 is thus driven synchronously with the A.C. voltage from the leads 266.

It is apparent that the number of reversals of the voltage from the leads 266 represents a definite displacement of the cable 81. Thus, the angular displacement of the motor 265 and the corresponding linear displacement of the photosensitive strip 252 is proportional to the linear displacement of the cable 81. It is thus apparent that the graph 270 represents a compound record of the variation of the signal derived from the leads 43 with respect to the depth of the bore hole.

The two signals obtained from the leads 198, 215 may be recorded simultaneously on a single strip of paper showing two separate graphs representing the variation of these signals with respect to the depth of the hole. In order to obtain such two graphs synchronized one with respect to the other, we may use an arrangement similar to the one of FIG. 5 in which, however, the portion comprised within the dotted rectangle has been replaced by a modified version shown in FIG. 5a. Referring now more particularly to FIG. 5a, the two leads 41 and 44 are connected to two separated galvanometer coils 301 and 302 provided with suitable mirrors that are adapted to move in a field of a permanent magnet (not shown in the figure) in response to the currents flowing through said coils. Beams of light derived from a source 303 are reflected by said mirrors on a moving strip 304 of photosensitive paper, said paper being driven by the motor 265 in the same manner as in FIG. 5. We thus obtain on the strip 304 two graphs representing respectively the signals derived from the leads 41 and 44.

Figure 6:
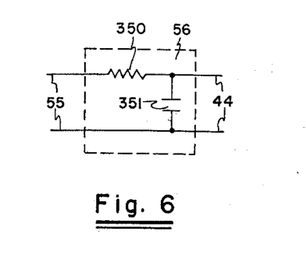
FIG. 6 shows diagrammatically an averaging network which is one of the elements of the arrangements of FIGS. 1, 2, and 5.

FIG. 6 shows the averaging network 56 comprised in the arrangements of FIGS. 1, 2, and 5. This network consists essentially of a resistance 350 between one of the input terminals 55 and one of the output terminals 44, and the capacitor 351 across the output terminals 44. The values of the capacitance and of the resistance determine the time constant of the circuit which also determines the time interval over which the signal across the input terminals is averaged. This signal applied to the input terminals 55 represents the instantaneous diameter of the bore hole, and the signal at the output terminals represents the average diameter of the hole.

Figure 7:
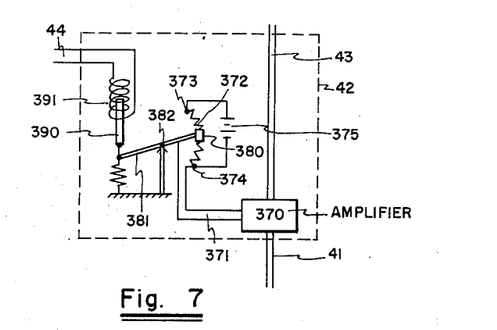
FIG. 7 shows diagrammatically a controllable network which is one of the elements of the arrangements of FIGS. 1, 2, and 5.

FIG. 7 represents the controllable network 42 comprised in the arrangements of FIGS. 1, 2, and 5. The input leads 41 are applied to a variable amplifier 370 having output leads 43 and control leads 371. The amplifying action is proportional to the voltage applied to the control leads 371. This voltage is derived from a potentiometer in which resistor 372 having output terminals 373 and 374 is connected to a battery 375. The resistor 375 is provided with a slidable contact 380 which is fastened to a lever 381 rotatable around a fixed point 382. The other end of the lever is connected to an iron core 390 which cooperates with a solenoid 391 having its output terminals connected to the leads 44.

The controllable network shown in FIG. 7 operates in the following manner: When the voltage across the leads 44 increases, the solenoid 391 attracts the iron core 390 which moves upwards. Thus the terminal 380 slides downward on the resistor 372 and the voltage between the movable terminal 380 and the fixed terminal 374 decreases. This voltage is applied to the leads 371. The specific resistance is not uniformly distributed along the periphery of the resistor 372. It is distributed in such a manner that when the voltage across the leads 371 increases, the voltage across the leads 371 decreases in accordance with a predetermined function. This decreasing voltage is applied to the control terminals of the amplifier 370 and thus the degree of amplification decreases in a definite manner with the increase of the voltage across the leads 44.

I claim:

1. In well-logging apparatus comprising an exploring housing, a cable for lowering the same into a bore hole and carrying signals from said housing to the earth's surface, and means for determining the depth of such housing, the combination which comprises means in said housing for detecting radiations entering said bore hole from surrounding formations and generating electrical impulses corresponding thereto, a rate meter for developing a voltage proportional to the rate of occurrence of said impulses, a variable-gain network fed by said voltage and connected to said cable, means for continuously sensing the cross-sectional size of said bore hole in the whereabouts of said housing while said housing is being moved from one depth to another theerin, and means controlled by said sensing means for adjusting the gain of said network, operative to transmit said voltage to the surface via said cable with its magnitude adjusted by said network to compensate for changes in said voltage caused by variations in said occurrence rate due to size changes in said bore hole.

2. In well-logging apparatus comprising an exploring housing, a cable for lowering the same into a bore hole and carrying signals from said housing to the earth's surface, and means for determining the depth of such housing, the combination which comprises means in said housing for detecting radiations entering said bore hole from surrounding formations and generating electrical impulses corresponding thereto, a rate meter for developing a voltage proportional to the rate of occurrence of said impulses, a variable-gain network fed by said voltage and connected to said cable, caliper means carried by said housing for measuring and continuously sensing the cross-sectional size of said bore hole, and means controlled by said caliper means for adjusting the gain of said network, operative to transmit said voltage to the surface via said cable with its magnitude adjusted by said network to compenstae for changes in said voltage caused by variations in said occurrence rate due to size changes in said bore hole.

3. In well-logging apparatus comprising an exploring housing, a cable for lowering the same into a bore hole and carrying signals from said housing to the earth's surface, and means for determining the depth of such housing, the combination which comprises means in said housing for detecting photons entering said bore hole from surrounding formations and generating electrical impulses of differing magnitudes corresponding respectively to the energies of said photons detected thereby, a first threshold network fed by said detecting means operative to pass only impulses above a predetermined magnitude, a second threshold network fed by said detector means operative to pass only impulses below a predetermined magnitude, a first rate meter fed by said first threshold network operative to generate a voltage proportional to the rate of occurrence of the impulses passed by said first threshold network, a second rate meter fed by said second threshold network operative to generate a second voltage proportional to the rate of occurrence of the impulses passed by said second threshold network, a variable-gain network fed by said first rate meter and connected to said cable, circuit means connecting said second rate meter to said variable-gain network operative to adjust the gain thereof responsively to changes in said second voltage, whereby the voltage output of said variable-gain network is adjusted in magnitude in accordance with changes in said second voltage.

4. In well-logging apparatus comprising an exploring housing, a cable for lowering the same into a bore hole and carrying signals from said housing to the earth's surface, and means for determining the depth of such housing, the combination which comprises means in said housing for detecting photons entering said bore hole from surrounding formations and generating electrical impulses of differing magnitudes corresponding respectively to the energies of said photons detected thereby, a first threshold network fed by said detecting means operative to pass only impulses above a predetermined magnitude, a second threshold network fed by said detector means operative to pass only impulses below a predetermined magnitude, a first rate meter fed by said first threshold network operative to generate a voltage proportional to the rate of occurrence of the impulses passed by said first threshold network, a second rate meter fed by said second threshold network operative to generate a second voltage proportional to the rate of occurrence of the impulses passed by said second threshold network, a variable-gain network fed by said first rate meter and connected to said cable, circuit means connecting said second rate meter to said variable-gain network operative to adjust the gain thereof responsively to changes in said second voltage, whereby the voltage output of said variable-gain network is adjusted in magnitude in accordance with changes in said second voltage, and means carried by said housing for generating and radiating into the bore hole photons having energies in the range passed by said second threshold network.

References Cited in the file of this patent

UNITED STATES PATENTS

| | | |
|---|---|---|
| 2,436,503 | Cleveland | Feb. 24, 1948 |
| 2,506,149 | Herzog | May 2, 1950 |
| 2,648,778 | Silverman et al. | Aug. 11, 1953 |
| 2,667,583 | Herzog | Jan. 26, 1954 |
| 2,680,201 | Scherbatskoy | June 1, 1954 |
| 2,710,925 | McKay | June 14, 1955 |
| 2,761,977 | McKay | Sept. 4, 1956 |
| 2,778,951 | Tittman | Jan. 22, 1957 |
| 2,842,675 | Scherbatskoy | July 8, 1958 |